(12) United States Patent
Su (10) Patent No.: US 11,290,152 B2
(45) Date of Patent: Mar. 29, 2022

(54) ANTENNA, CONTROL METHOD, AND STORAGE MEDIUM

(71) Applicant: Lenovo (Beijing) Co., Ltd., Beijing (CN)

(72) Inventor: Chen Su, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 85 days.

(21) Appl. No.: 16/910,950

(22) Filed: Jun. 24, 2020

(65) Prior Publication Data

US 2020/0412412 A1 Dec. 31, 2020

(30) Foreign Application Priority Data

Jun. 25, 2019 (CN) .......................... 201910556826.9

(51) Int. Cl.

| H01Q 1/38 | (2006.01) |
|---|---|
| H04B 3/56 | (2006.01) |
| H01Q 1/24 | (2006.01) |
| H01Q 3/24 | (2006.01) |
| H01Q 21/28 | (2006.01) |

(52) U.S. Cl.
CPC ............... *H04B 3/56* (2013.01); *H01Q 1/243* (2013.01); *H01Q 1/38* (2013.01); *H01Q 3/24* (2013.01); *H01Q 21/28* (2013.01)

(58) Field of Classification Search
CPC ............ H01Q 21/28; H01Q 3/24; H01Q 1/38; H01Q 1/243
See application file for complete search history.

(56) References Cited

FOREIGN PATENT DOCUMENTS

| CN | 101431182 A | 5/2009 |
|---|---|---|
| CN | 102074795 A | 5/2011 |
| CN | 103367890 A | 10/2013 |
| CN | 104506221 A | 4/2015 |
| CN | 105556869 A | 5/2016 |
| CN | 109391984 A | 2/2019 |

*Primary Examiner* — Graham P Smith
(74) *Attorney, Agent, or Firm* — Anova Law Group, PLLC (57) ABSTRACT

An antenna includes an antenna circuit, at least two switch circuits, and a processor. The at least two switch circuits are arranged in at least two gaps of two side surfaces of the antenna circuit. The processor is configured to obtain a plurality of signal strengths received by the antenna circuit from each of a plurality of radiation directions, based on the plurality of signal strengths, determine a first strongest signal strength and a radiation direction corresponding to the strongest signal strength, and lock in a first radiation direction of the antenna circuit in the radiation direction corresponding to the first strongest signal strength. The plurality of radiation directions are formed by controlling on/off states of the at least two switch circuits.

13 Claims, 3 Drawing Sheets

ANTENNA, CONTROL METHOD, AND STORAGE MEDIUM

CROSS-REFERENCE TO RELATED APPLICATION

This application claims priority to Chinese Patent Application No. 201910556826.9, filed on Jun. 25, 2019, the entire content of which is incorporated herein by reference.

TECHNICAL FIELD

The present disclosure relates to the antenna technology field and, more particularly, to an antenna, a control method, and a storage medium.

BACKGROUND

A user may use an antenna inside a mobile terminal to receive a signal transmitted by another device such as a router for accessing the internet and other entertainment services. The antenna has a directional characteristic, that is, the antenna has different radiating or receiving capabilities in different directions. Therefore, when the user holds the mobile terminal in a different direction, the signal received by the antenna from the other device may fluctuate. As such, the antenna may not receive the strongest signals from different directions in operation, which impairs user experience.

SUMMARY

Embodiments of the present disclosure provide an antenna including an antenna circuit, at least two switch circuits, and a processor. The at least two switch circuits are arranged in at least two gaps of two side surfaces of the antenna circuit. The processor is configured to obtain a plurality of signal strengths received by the antenna circuit from each of a plurality of radiation directions, based on the plurality of signal strengths, determine a first strongest signal strength and a radiation direction corresponding to the strongest signal strength, and lock in a first radiation direction of the antenna circuit at the radiation direction corresponding to the first strongest signal strength. The plurality of radiation directions are formed by controlling on/off states of the at least two switch circuits.

Embodiments of the present disclosure provide a method for controlling an antenna. The method includes obtaining a plurality of signal strengths received by an antenna circuit from each of a plurality of radiation directions, based on the plurality of signal strengths, determining a first strongest signal strength and a radiation direction corresponding to the strongest signal strength, and locking in a first radiation direction of the antenna circuit at the radiation direction corresponding to the first strongest signal strength. The plurality of radiation directions are formed by controlling on/off states of at least two switch circuits.

Embodiments of the present disclosure provide an antenna control device, including a processor and a memory. The memory stores a computer program that, when executed by the processor, causes the processor to obtain a plurality of signal strengths received by an antenna circuit from each of a plurality of radiation directions, based on the plurality of signal strengths, determine a first strongest signal strength and a radiation direction corresponding to the strongest signal strength, and lock in a first radiation direction of the antenna circuit at the radiation direction corresponding to the first strongest signal strength. The plurality of radiation directions are formed by controlling on/off states of at least two switch circuits.

DETAILED DESCRIPTION OF THE EMBODIMENTS

To understand features and technical contents of the present disclosure in more detail, the present disclosure is described in detail below in connection with the drawings. The drawings are merely used for reference but not used to limit the present disclosure.

In embodiments of the present disclosure, the mobile terminal obtains a plurality of signal strengths received by an antenna circuit from each of a plurality of radiation directions. The plurality of radiation directions are formed by controlling on/off states of at least two switch circuits. Based on the plurality of signal strengths, the mobile terminal determines a strongest signal strength and determines a radiation direction corresponding to the strongest signal strength. The mobile terminal locks in a radiation direction of the antenna circuit at the radiation direction corresponding to the strongest signal strength.

Figure 1:
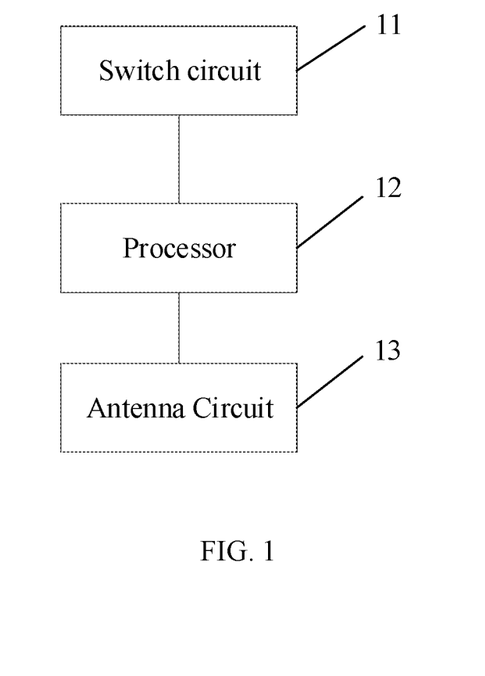
FIG. 1 illustrates a schematic structural diagram of an antenna according to some embodiments of the present disclosure.

Embodiments of the present disclosure provide an antenna, which may be placed in a mobile terminal. As shown in FIG. 1, the antenna includes at least two switch circuits 11, a processor 12, and an antenna circuit 13. The at least two switch circuits 11 are arranged in at least two gaps of side surfaces of the antenna circuit 13. The processor 12 is configured to obtain the plurality of signal strengths received by the antenna circuit 13 from each of the plurality of radiation directions that correspond to the antenna circuit 13. The plurality of radiation directions are formed by controlling the on/off states of the at least two switch circuits 11. Based on the plurality of signal strengths, the processor 12 is configured to determine the strongest signal strength and determine the radiation direction corresponding to the strongest signal strength. The processor 12 is also configured to lock in the radiation direction of the antenna circuit 13 in the radiation direction corresponding to the strongest signal strength.

The plurality of radiation directions may include a plurality of radiation directions that can fully cover 360° C. For example, the plurality of radiation directions may cover at least one radiation direction from 0° C. to 90° C., cover at least one radiation direction from 90° C. to 180° C., cover at least one radiation direction from 180° C. to 270° C., and cover at least one radiation direction from 270° C. to 360° C.

In practical applications, to make the radiation directions of the antenna circuit 13 fully cover 360° C., at least two gaps are arranged on at least two side surfaces of the antenna circuit 13. One switch circuit 11 is arranged in each of the gaps. As such, the processor 12 may control the on/off states of the at least two switch circuits 11 to change a direction of current flowing through a ground of the antenna circuit 13. Thus, the radiation direction of the antenna circuit 13 is changed by the principle of electromagnetic induction.

In some embodiments, for each of the at least two switch circuits 11, an arrangement direction of the corresponding switch circuit is different from the direction of the current flowing through the ground of the antenna circuit 13.

When the arrangement direction of the corresponding switch circuit is different from the direction of the current flowing through the ground of the antenna circuit 13, the processor 12 may control the on/off states of the at least two switch circuits 11 to change the direction of the current flowing through the ground of the antenna circuit. As such, the radiation direction of the antenna circuit 13 is changed by the principle of electromagnetic induction.

In practical applications, the switch circuit may refer to a switch circuit that can change the direction of the current flowing through the ground of the antenna circuit to cause the radiation direction to the antenna circuit 13 to change. The switch circuit may include a switch device, such as a diode, or a field-effect transistor.

In some embodiments, for each of the at least two switch circuits 11, the corresponding switch circuit may include a diode or a field-effect transistor.

In practical applications, the user may become tired by holding the terminal with a fixed posture for a long time. Therefore, the user may change a holding direction for the terminal after holding the terminal with a certain posture for a certain period. As such, the signal received by the antenna circuit 13 from another device such as a router may fluctuate. Thus, the terminal needs to re-determine a radiation direction corresponding to the strongest signal strength to ensure that the antenna circuit 13 may receive the signal with the strongest strength at any time moment, so as to improve the user experience.

In some embodiments, the processor 12 is further configured to determine a scan duration. The scan duration indicates a time interval between two adjacent times of obtaining the plurality of signal strengths. After the processor 12 obtains the plurality of signal strengths received by the antenna circuit 13 from each of the plurality of radiation directions that correspond to the antenna circuit 13, and after the scan duration, the mobile terminal re-obtain a plurality of signal strengths received by the antenna circuit 13 from each of the plurality of radiation directions that correspond to the antenna circuit 13. Based on the plurality of re-obtained signal strengths, the processor 12 re-determines a strongest signal strength and determines a radiation direction corresponding to the re-determined strongest signal strength. The processor 12 then locks in the radiation direction of the antenna in the radiation direction corresponding to the re-determined strongest signal strength.

The scan duration may be set according to actual situations.

For example, assume that the scan duration is 2 minutes, at the current moment, the processor 12 obtains the plurality of signal strengths received by the antenna circuit 13 from each of the plurality of radiation directions that correspond to the antenna circuit 13. After 2 minutes, the processor 12 may re-obtain the plurality of signal strengths received by the antenna circuit 13 from each of the plurality of radiation directions that correspond to the antenna circuit 13, and re-determine the radiation direction corresponding to the strongest signal strength.

The user may hold the mobile terminal in a different direction or angle within 2 minutes. For example, the user changes from holding the terminal with the right hand to holding the terminal with the left hand, or the user holds the terminal and turns for one circle at the current position. Then, the processor 12 needs to re-determine the strongest signal strength and determine the radiation direction corresponding to the re-determined strongest signal strength. As such, the processor 12 may be ensured to receive the signal with the strongest strength at any time.

In practical applications, when the user holds the terminal in a different direction or angle, the signal received by the antenna 13 from another device such as a router may fluctuate. Therefore, the processor 12 needs to re-determine the strongest signal strength, and the radiation direction corresponding to the strongest signal strength. As such, the mobile terminal may be ensured to receive the signal with the strongest strength from different directions in space, so as to improve the user experience.

In some embodiments, the processor 12 is further configured to obtain a second signal strength in the radiation direction corresponding to the strongest signal strength. When a difference between the second signal strength and the strongest signal strength is larger than a predetermined threshold, the processor 12 is configured to re-obtain a plurality of signal strengths received by the antenna circuit 13 from each of the plurality of radiation directions that correspond to the antenna circuit 13. Based on the re-obtained plurality of signal strengths, the processor 12 is configured to re-determine the strongest signal strength and a radiation direction corresponding to the strongest signal strength. The processor 12 is further configured to lock in the radiation direction of the antenna circuit in the radiation direction corresponding to the re-determined strongest signal strength.

The predetermined threshold may be set according to the actual situations. In some embodiments, the predetermined threshold may be set according to the holding direction of the user for the terminal, or the predetermined threshold may be set according to the holding angle of the user for the terminal. For example, if the user changes from holding the terminal with the right hand facing upward to holding the terminal with the right hand facing downward, and the predetermined threshold may be set to 10 dB. If the user holds the terminal and turns for a half-circle at the current position, the predetermined threshold may be set to 20 dB.

For example, assume that the predetermined threshold is 10 dB, and the strongest signal strength is 15 dB, the processor 12 obtains the second signal strength received by the antenna circuit in the radiation direction corresponding to the strongest signal strength every 10 s. If the difference between the second signal strength and the strongest signal strength is larger than the predetermined threshold, this means that the user changes from holding with the right hand facing upward to holding with the right hand facing downward. Thus, the processor 12 needs to re-determine the strongest signal strength and determine the radiation direction corresponding to the re-determined strongest signal strength. The processor 12 then needs to lock in the radiation direction of the antenna circuit in the radiation direction corresponding to the re-determined strongest strength.

In some embodiments, the processor 12 may continuously obtain the second signal strength received by the antenna circuit in the radiation direction corresponding to the strongest signal strength. If the difference between the second signal strength and the strongest signal strength is larger than the predetermined threshold, this means that the user changes from holding with right hand facing upward to holding with right hand facing downward. Thus, the processor 12 needs to re-determine the strongest signal strength and determine the radiation direction corresponding to the re-determined strongest signal strength. The processor 12 then needs to lock in the radiation direction of the antenna circuit in the radiation direction corresponding to the re-determined strongest strength. As such, the processor 12 may be ensured to receive the signal with the strongest strength from the different directions in space.

The processor 12 may control the on/off states of the at least two switch circuits 11 to change the direction of the current flowing through the ground of the antenna 13, such that the radiation direction of the antenna 13 may change. Therefore, after the processor 12 determines the radiation direction corresponding to the strongest signal strength, the processor 12 may lock in the on/off states of the at least two switch circuits 11 to lock in the radiation direction of the antenna circuit in the radiation direction corresponding to the strongest signal strength.

Figure 2:
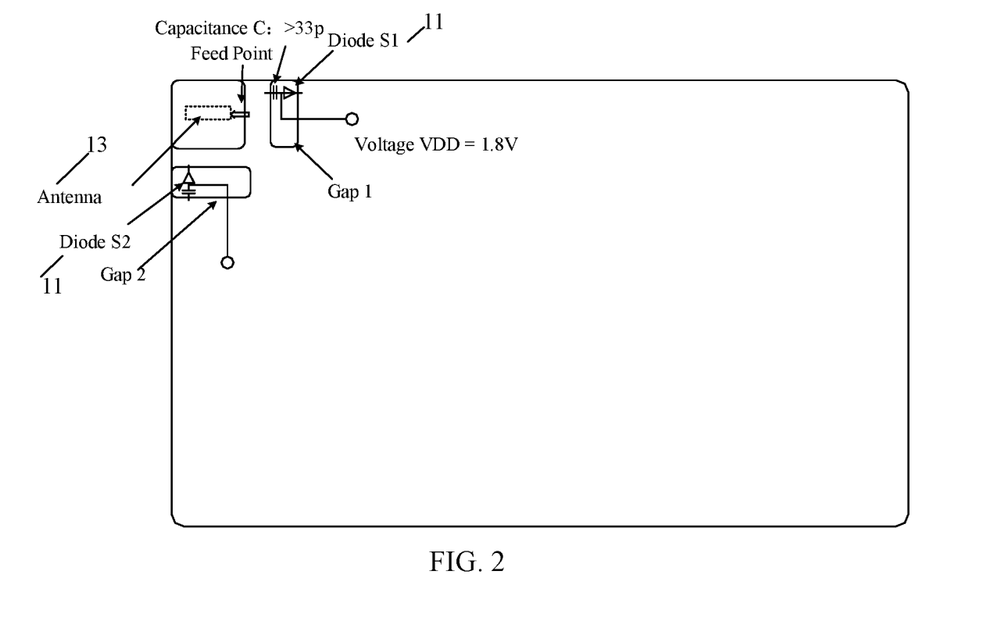
FIG. 2 illustrates a schematic structural diagram of the specific composition of the antenna according to some embodiments of the present disclosure.

FIG. 2 illustrates a schematic structural diagram of the specific composition of the antenna according to some embodiments of the present disclosure. As shown in FIG. 2, the at least two switch circuits 11 includes a diode S1 and a diode S2. The antenna circuit 13 includes an antenna Antenna. The antenna Antenna is arranged at an upper left corner of an antenna area. In practical applications, the antenna Antenna may be arranged at an upper right corner, lower left corner, etc., according to actual needs.

The diode S1 is arranged in gap 1 at the right side of the antenna Antenna. A distance from the right frame of the antenna Antenna to gap 1 may be 3 mm. The width of gap 1 may be 2 mm.

The diode S2 is arranged in gap 2 at the bottom side of the antenna Antenna. A distance from a bottom frame of the antenna Antenna to gap 2 may be the same as the distance from the right frame of the antenna Antenna to gap 1, such as 3 mm. The width of gap 2 may be the same as the width of gap 1, such as 2 mm.

Figure 3:
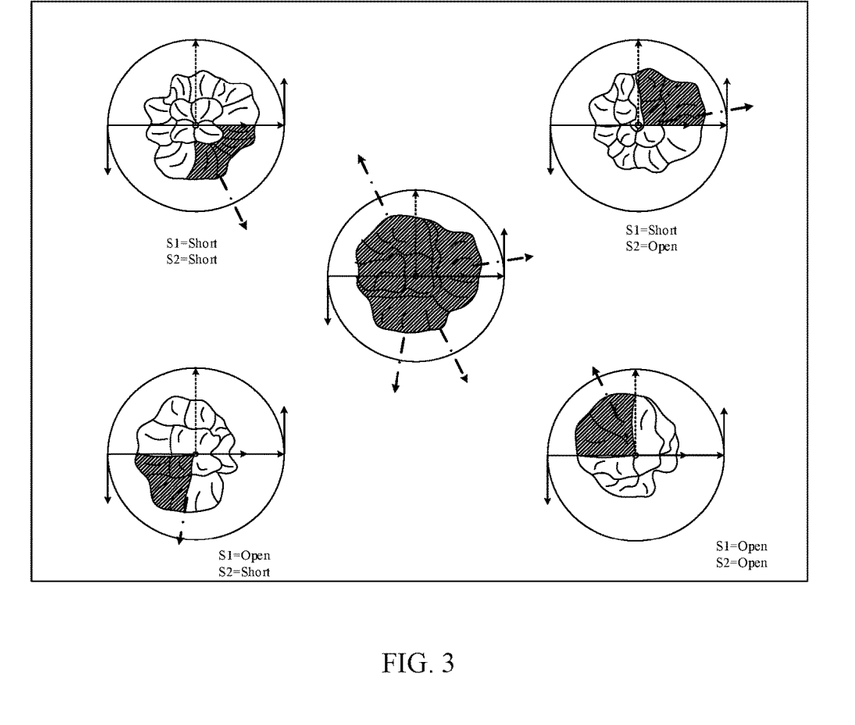
FIG. 3 illustrates a schematic diagram of radiation directions of an antenna circuit according to some embodiments of the present disclosure.

The operating principle of the antenna shown in FIG. 2 may be described as follows. A central processor (CPU) (not shown in FIG. 2) may generate a control signal of 2 dB. Based on the generated control signal, the CPU controls the on/off states of the diode S1 and diode S2 to change the direction of the current flowing through the ground of the antenna Antenna. As such, the radiation direction of the antenna Antenna is changed by the principle of electromagnetic induction. For example, the CPU generates a control signal of 2 dB, such as 00, which controls the diode S1 to be off, and the diode S2 to be off. At this moment, the radiation direction of the antenna Antenna is not changed and is the original radiation direction, as shown in FIG. 3, which is the radiation direction in a range from 90° C. to 180° C. The CPU generates a control signal of 2 dB, such as 01, which controls the diode S1 to be off, and the diode S2 to be on to change the direction of the current flowing through the ground of the antenna Antenna for a first time. As such, the radiation direction of the antenna Antenna is changed by the principle of electromagnetic induction for a first time. As shown in FIG. 3, the radiation direction is obtained in a range from 90° C. to 270° C. The CPU generates a control signal of 2 dB, such as 10, which controls the diode S1 to be on, and the diode S2 to be off to change the direction of the current flowing through the ground of the antenna Antenna for a second time. As such, the radiation direction of the antenna Antenna is changed by the principle of electromagnetic induction for a second time. As shown in FIG. 3, the radiation direction is obtained in a range from 0° C. to 90° C. The CPU generates a control signal of 2 dB, such as 11, which controls the diode S1 to be on, and the diode S2 to be on to change the direction of the current flowing through the ground of the antenna Antenna for a third time. As such, the radiation direction of the antenna Antenna is changed by the principle of electromagnetic induction for a third time. As shown in FIG. 3, the radiation direction is obtained in a range from 270° C. to 360° C.

The CPU obtains four signal strengths received by the antenna Antenna from each of the four above-described radiation directions that correspond to the antenna Antenna. Based on the four signal strengths, the CPU determines the strongest signal strength and the radiation direction corresponding to the strongest signal strength. If the radiation direction corresponding to the strongest signal strength is the radiation direction shown in FIG. 3b, the CPU locks in the control signal to lock in the diode S1 to be off and the diode S2 to be on. As such, the radiation direction of the antenna Antenna is locked in in the radiation direction corresponding to the strongest signal strength.

The CPU may control the on/off states of the diode S1 and the diode S2 to form the four radiation directions of the antenna Antenna to fully cover 360° C. As such, the CPU may obtain the plurality of signal strengths received by the antenna Antenna from each of the plurality of radiation directions that correspond to the antenna Antenna. Based on the plurality of signal strengths, the CPU determines the strongest signal strength and the radiation direction corresponding to the strongest signal strength. The CPU further locks in the radiation direction of the antenna Antenna in the radiation direction corresponding to the strongest signal strength.

After the CPU locks in the radiation direction of the antenna Antenna in the radiation direction corresponding to the strongest signal strength, the CPU may start a timer. When the timer count reaches the scan duration of 2 minutes, the CPU may re-obtain the plurality of signal strengths received by the antenna Antenna from each of the plurality of radiation directions that correspond to the antenna Antenna. Based on the re-obtained plurality of signal strengths, the CPU re-determines the strongest signal strength and the radiation direction corresponding to the re-determined strongest signal. The CPU may further lock in the radiation direction of the antenna Antenna in the radiation direction corresponding to the re-determined strongest signal strength. As such, the antenna Antenna may receive the signal with the strongest strength at any time moment.

Similarly, by locking in the radiation direction of the antenna Antenna in the radiation direction corresponding to the strongest signal strength, the CPU may further obtain the second signal strength in the radiation direction corresponding to the strongest signal strength. When the difference between the second signal strength and the strongest signal strength is larger than the predetermined threshold, the CPU re-obtains the plurality of signal strengths received by the antenna Antenna from each of the plurality of radiation directions that correspond to the antenna Antenna. Based on the re-obtained plurality of signal strengths, the CPU re-determines the strongest signal strength and determines the radiation direction corresponding to the re-determined strongest signal strength. The CPU further locks in the radiation direction of the antenna Antenna in the radiation direction corresponding to the re-determined strongest signal strength.

As such, the antenna Antenna may receive the signal with the strongest strength from any direction in space.

Figure 4:
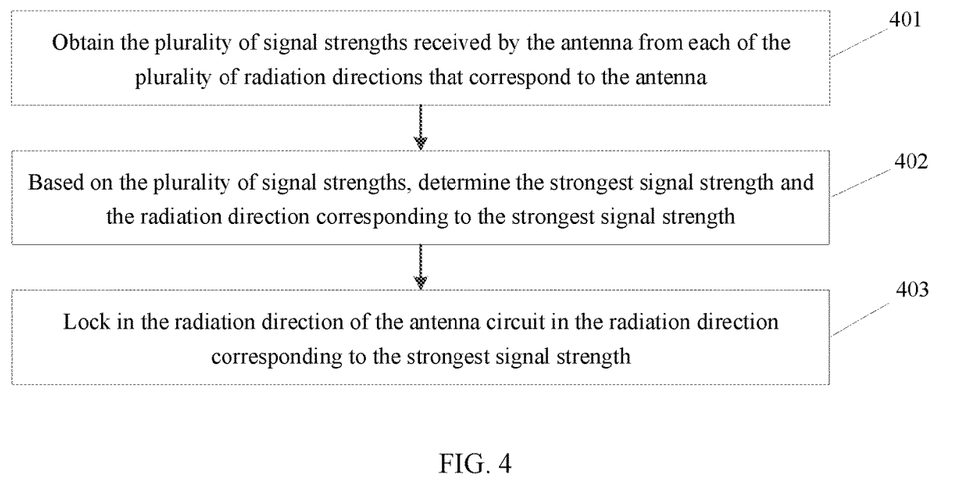
FIG. 4 illustrates a schematic flowchart of implementing a control method according to some embodiments of the present disclosure.

To implement the above-described structure of the antenna, embodiments of the present disclosure further provide a control method. As shown in FIG. 4, the implementation process of the control method is described as follows.

At 401, the method includes obtaining the plurality of signal strengths received by the antenna Antenna from each of the plurality of radiation directions that correspond to the antenna Antenna. The plurality of radiation directions are formed by controlling the on/off states of the at least two switch circuits.

The plurality of radiation directions may be the plurality of radiation directions that may fully cover 360° C. For example, the plurality of radiation directions may cover at least one radiation direction from 0° C. to 90° C., at least one radiation direction from 90° C. to 180° C., at least one radiation direction from 180° C. to 270° C., and at least one radiation direction from 270° C. to 360° C.

In practical applications, to make the radiation directions of the antenna circuit to fully cover 360° C., the at least two gaps are arranged at the at least two side surfaces of the antenna circuit. One switch circuit is arranged in each gap. As such, the method may include controlling the on/off states of the at least two switch circuits to change the direction of the current flowing through the ground of the antenna circuit to further change the radiation direction of the antenna circuit by the principle of electromagnetic induction.

In some embodiments, for each of the at least two switch circuits, the arrangement direction of the corresponding switch circuit is different from the direction of the current flowing through the ground of the antenna circuit.

When the arrangement direction of the corresponding switch circuit is different from the direction of the current flowing through the ground of the antenna circuit, the method may include controlling the on/off states of the at least two switch circuits to change the direction of the current flowing through the ground of the antenna circuit. As such, the radiation direction of the antenna circuit is changed by the principle of electromagnetic induction.

In practical applications, the switch circuit may refer to the switch circuit that may change the direction of the current flowing through the ground of the antenna circuit to change the radiation direction of the antenna circuit. The switch circuit may include the switch device, such as a diode or a field-effect transistor.

In some embodiments, for each of the at least two switch circuits, the corresponding switch circuit may be a diode or a field-effect transistor.

At 402, based on the plurality of signal strengths, the method includes determining the strongest signal strength and the radiation direction corresponding to the strongest signal strength.

In practical applications, the method includes comparing the two adjacent signal strengths of the plurality of signal strengths to obtain a comparison result. Based on the comparison result, the method includes determining the strongest signal strength.

Based on the strongest signal strength and the directions of the signals received by the antenna from other devices, the method includes determining the corresponding radiation direction.

At 403, the method includes locking in the radiation direction of the antenna circuit in the radiation direction corresponding to the strongest signal strength.

After determining the radiation direction corresponding to the strongest signal strength, the method may include controlling the on/off states of the at least two switch circuits to lock in the radiation direction of the antenna circuit at the radiation direction corresponding to the strongest signal strength.

In practical applications, since the user may become tired by holding the terminal with a fixed posture for a long time, the user may change the holding direction for the terminal after holding the terminal with a certain posture for a certain period. As such, the signal received by the antenna circuit 13 from another device such as a router may fluctuate. Therefore, the method may include re-determining a radiation direction corresponding to the strongest signal strength to ensure that the antenna circuit 13 may receive the signal with the strongest strength at any time moment. The user experience is thus improved.

In some embodiments, the control method may further include determining the scan duration, and the scan duration indicates the time interval of two adjacent times of obtaining the plurality of signal strengths. After obtaining the plurality of signal strengths received by the antenna from each of the plurality of radiation directions that correspond to the antenna circuit, after the scan duration, the method further includes re-obtaining the plurality of signal strengths received by the antenna circuit from each of the plurality of radiation directions that correspond to the antenna circuit. The control method further includes re-determining the strongest signal strength and determining the radiation direction corresponding to the re-determined strongest signal strength based on the re-obtained plurality of radiation directions. The control method further includes locking in the radiation direction of the antenna circuit at the radiation direction corresponding to the re-determined strongest signal strength.

The scan duration may be set according to the actual situations.

After locking in the radiation direction of the antenna circuit in the radiation direction corresponding to the strongest signal strength, the control method includes starting the timer. After the timer count reaches the scan duration such as 2 minutes, the control method may include re-obtaining the plurality of signal strengths received by the antenna circuit from each of the plurality of radiation directions that correspond to the antenna circuit. The control method may further include re-determining the strongest signal strength and determining the radiation direction corresponding to the strongest signal strength based on the re-obtained plurality of signal strengths. The control method may further include locking in the radiation direction of the antenna circuit in the radiation direction corresponding to the re-determined strongest signal strength. As such, the antenna circuit may receive the signal with the strongest strength at any time moment.

In practical applications, when the user changes the holding direction or holding angle for the terminal, the signal received by the antenna from another device such as a router may fluctuate. Therefore, the control method may further include re-determining the strongest signal strength and the radiation direction corresponding to the re-determined strongest signal strength to ensure the antenna to receive the signal with the strongest strength from the different directions in space. As such, the user experience is improved.

In some embodiments, the method further includes obtaining a second signal strength from the radiation direction corresponding to the strongest signal strength. When the difference between the second signal strength and the strongest signal strength is larger than the predetermined threshold, the method further includes re-obtaining the plurality of signal strengths received by the antenna circuit from each of the plurality of radiation directions that correspond to the antenna circuit. Based on the re-obtained plurality of signal strengths, the method further includes re-determining the strongest signal strength and determining the radiation direction of the re-determined strongest signal strength. The method further includes locking in the radiation direction of the antenna circuit in the radiation direction corresponding to the re-determined strongest signal strength.

The predetermined threshold may be set according to actual situations.

After locking in the radiation direction of the antenna circuit at the radiation direction corresponding to the strongest signal strength, the method may further include obtaining a second signal strength received by the antenna circuit at the radiation direction corresponding to the strongest signal strength. When the difference between the second signal strength and the strongest signal strength is larger than the predetermined threshold, the method further includes re-obtaining the plurality of signal strengths received by the antenna circuit from each of the plurality of radiation directions that correspond to the antenna circuit. Based on the re-obtained plurality of signal strengths, the method may further include re-determining the strongest signal strength and determining the radiation direction corresponding to the re-determined strongest signal strength. The method further includes locking in the radiation direction of the antenna circuit in the radiation direction corresponding to the strongest signal strength. As such, the antenna circuit may receive the signal with the strongest strength from the different directions in space.

By using the technical solution provided by embodiments of the present disclosure, the method includes controlling the on/off states of the at least two switch circuits to form the plurality of radiation directions. As such, the method may include obtaining the plurality of signal strengths received by the antenna circuit from each of the plurality of radiation directions that correspond to the antenna circuit, and determining the strongest signal strength and the radiation direction corresponding to the strongest signal strength. Therefore, the antenna circuit may use the radiation direction corresponding to the strongest signal strength to receive the signal with the strongest strength from the different directions in space. As such, the user experience is improved.

Figure 5:
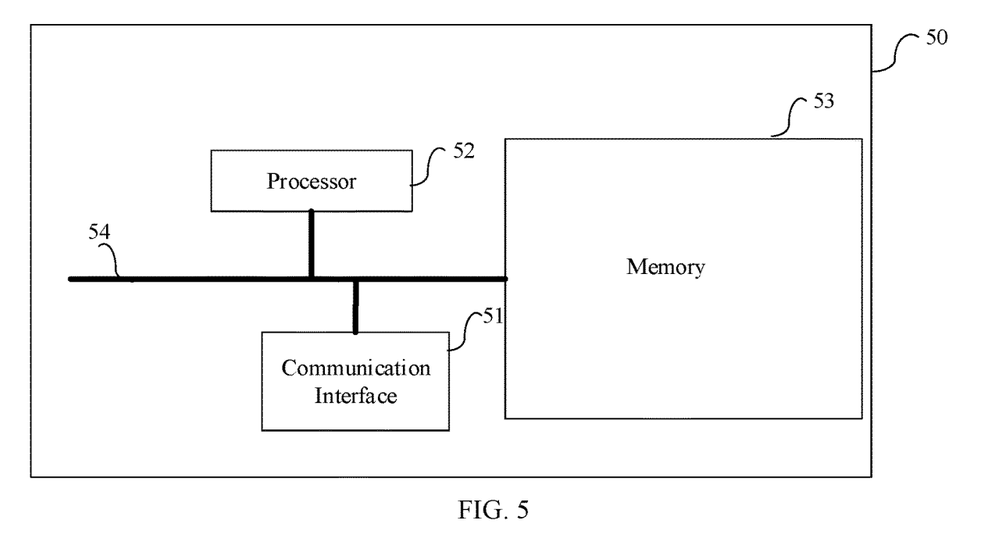
FIG. 5 illustrates a schematic structural diagram of the composition of a control device according to some embodiments of the present disclosure.

Embodiments of the present disclosure further provide a control device. As shown in FIG. 5, the control device 50 includes a communication interface 51, a processor 52, and a memory 53. The communication interface 51 can exchange information with other devices. The processor 52 is connected to the communication interface 51. When running a computer program, the processor executes the method provided by one or more technical solutions of the above-described smart device. The computer program is stored in the memory 53.

In practical applications, each of the assemblies of the control device 50 is coupled with each other through a bus system 54. The bus system 54 is configured to realize connection and communication among these assemblies. In addition to a data bus, the bus system 54 also includes a power bus, a control bus, and a status signal bus. However, for clarity of the description, various buses are marked as the bus system 54 in FIG. 5.

In embodiments of the present disclosure, the memory 53 is configured to store various types of data to support the operation of the control device 50. Examples of these data include any computer program being operated by the control device 50.

The method disclosed by embodiments of the present disclosure may be applied to the processor 52 or be realized by the processor 52. The processor 52 may be an integrated circuit chip with signal processing capabilities. In an implementation process, each process of the above-described method may be completed by an integrated logic circuit of hardware in the processor 52 or instructions in the form of software. The processor 52 described above may be a general-purpose processor, a digital signal processor (DSP), or other programmable logic devices, discrete gates or transistor logic devices, discrete hardware components, etc. The processor 52 may implement or execute the methods, processes, and logical block diagrams disclosed in the embodiments of the present application. The general-purpose processor may be a microprocessor or any conventional processor. The processes of the method disclosed in embodiments of the present application may be directly implemented and completed by a hardware decoding processor, or may be implemented and completed by a combination of hardware and software modules in the decoding processor. The software module may be located in a storage medium. The storage medium is located in the memory 53. The processor 52 reads the information in the memory 53 and completes the processes of the above-described method in combination with its hardware.

In an exemplary embodiment, the control device 50 may be realized by one or more application-specific integrated circuits (ASICs), digital signal processors (DSPs), programmable logic devices (PLDs), complex programmable logic devices (CPLDs), complex programmable logic devices (CPLDs), field-programmable gate arrays (FPGAs), general-purpose processors, controllers, micro controller units (MCUs), microprocessors, or other electronics components implementation for performing the aforementioned method. The control device 50 is configured to execute the above-described method.

In embodiments of the present disclosure, the memory 53 may include volatile memory or non-volatile memory, or may also include both the volatile and non-volatile memory. The non-volatile memory may include read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, disc, or compact disc read-only memory (CD-ROM). The magnetic surface memory may include magnetic disk storage or magnetic tape storage. The volatile memory may include a random-access memory (RAM), which is used as an external high-speed cache. The present embodiment is merely exemplary but not limited, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced type synchronous dynamic random access memory (ESDRAM), SyncLink dynamic random access memory (SLDRAM), direct memory bus random access memory (DRRAM). The memories described in embodiments of the present disclosure are intended to include but are not limited to these and any other suitable types of memories.

Terms of "first," "second," etc. are used to distinguish similar objects, and do not have to be used to describe a specific order or sequence.

In embodiments provided in the present disclosure, the disclosed device and method may be implemented in other ways. The device embodiments described above are only schematic. For example, divisions of the units are only logical function divisions, and in actual implementation, other divisions may exist, for example, multiple units or components may be combined, or may be integrated into another system, or some features may be ignored, or not implemented. In addition, the coupling or direct coupling or communication connection between the displayed or discussed components may be through some interfaces, and the indirect coupling or communication connection of the device or unit may be electrical, mechanical, or other forms.

The units described above as separate components may or may not be physically separate, and the components displayed as units may or may not be physical units. That is, they may be located in one place or distributed to multiple network units. Some or all of the units may be selected according to actual needs to achieve the purpose of the solution of the present embodiment.

In addition, the functional units in embodiments of the present disclosure may all be integrated into one processing module, or each unit may be separately used as a unit, or two or more units may be integrated into one unit. The above-integrated unit may be implemented in the form of hardware, or in the form of hardware plus software functional units. Those of ordinary skill in the art may understand that all or part of the processes to implement the above-described method embodiments may be completed by program-instruction-related hardware. The above-described program may be stored in a computer-readable storage medium, and when the program is executed, the processes of the above-described method embodiments are executed. The above-described storage medium includes a mobile storage device, a ROM, a RAM, a magnetic disk, or an optical disk and other various media that can store program codes.

The methods disclosed in method embodiments of the present disclosure may be arbitrarily combined without conflict to obtain new method embodiments.

The features disclosed in product embodiments of the present disclosure may be combined arbitrarily without conflicts to obtain new product embodiments.

The features disclosed in the method or device embodiments of the present disclosure may be combined arbitrarily without conflict to obtain new method embodiments or device embodiments.

The above-described embodiments are only specific embodiments of the present disclosure, but the scope of the present disclosure is not limited to this. Any person skilled in the art may easily think of modifications or replacements within the technical scope disclosed by the present disclosure. All modifications and replacements should be within the scope of the present disclosure. Therefore, the scope of the present disclosure shall be subject to the scope of the claims.

What is claimed is:

1. An antenna, comprising:
   an antenna circuit;
   at least two switch circuits, arranged in at least two gaps of two side surfaces of the antenna circuit; and
   a processor, configured to:
      obtain a plurality of signal strengths received by the antenna circuit from each of a plurality of radiation directions, the plurality of radiation directions being formed by controlling on/off states of the at least two switch circuits;
      based on the plurality of signal strengths, determine a first strongest signal strength and a radiation direction corresponding to the strongest signal strength; and
      lock in a first radiation direction of the antenna circuit in the radiation direction corresponding to the first strongest signal strength.

2. The antenna of claim 1, wherein for each of the at least two switch circuits, a corresponding switch circuit includes a diode or a field effect transistor.

3. The antenna of claim 1, wherein for each of the at least two switch circuits, an arrangement direction of a corresponding switch circuit is different from a direction of a current flowing through a ground of the antenna circuit.

4. The antenna of claim 1, wherein the processor is further configured to:
   determine a scan duration, indicating a time interval between two adjacent times of obtaining the plurality of signal strengths;
   obtain the plurality of signal strengths received by the antenna circuit from each of the plurality of radiation directions;
   after a scan duration, re-obtain a plurality of signal strengths received by the antenna circuit from each of the plurality of radiation directions;
   based on the re-obtained plurality of signal strengths, determine a second strongest signal strength and determine a second radiation direction corresponding to the second strongest signal; and
   lock in the second radiation direction of the antenna circuit in the radiation direction corresponding to the second strongest signal strength.

5. The antenna of claim 1, wherein the processor is further configured to:
   obtain a second signal strength received by the antenna circuit at the radiation direction corresponding to the first strongest signal strength;
   when a difference between the second signal strength and the first strongest signal strength is larger than a predetermined threshold, re-obtain a plurality of signal strengths received by the antenna circuit from each of the plurality radiation directions that correspond to the antenna circuit;
   based on the re-obtained plurality of signal strengths, determine a third strongest signal strength and a third radiation direction corresponding to the third strongest signal strength; and
   lock in the third radiation direction of the antenna circuit in the radiation direction corresponding to the third strongest signal strength.

6. A method for controlling an antenna, comprising:
   obtaining a plurality of signal strengths received by an antenna circuit from each of a plurality of radiation directions, the plurality of radiation directions being formed by controlling on/off states of at least two switch circuits;
   based on the plurality of signal strengths, determining a first strongest signal strength and a radiation direction corresponding to the strongest signal strength; and
   locking in a first radiation direction of the antenna circuit in the radiation direction corresponding to the first strongest signal strength.

7. The method of claim 6, further comprising:
determining a scan duration, indicating a time interval of two adjacent times of obtaining the plurality of signal strengths;
obtaining the plurality of signal strengths received by the antenna circuit from each of the plurality of radiation directions;
after a scan duration, re-obtaining a plurality of signal strengths received by the antenna circuit from each of the plurality of radiation directions that correspond to the antenna circuit;
based on the re-obtained plurality of signal strengths, determining a second strongest signal strength and determine a second radiation direction corresponding to the second strongest signal; and
locking in the second radiation direction of the antenna circuit in the radiation direction corresponding to the second strongest signal strength.

8. The method of claim 6, further comprising:
obtaining a second signal strength received by the antenna circuit at the radiation direction corresponding to the first strongest signal strength;
when a difference between the second signal strength and the first strongest signal strength is larger than a predetermined threshold, re-obtaining a plurality of signal strengths received by the antenna circuit from each of the plurality radiation directions that correspond to the antenna circuit;
based on the re-obtained plurality of signal strengths, determining a third strongest signal strength and a third radiation direction corresponding to the third strongest signal strength; and
locking in the third radiation direction of the antenna circuit at the radiation direction corresponding to the third strongest signal strength.

9. An antenna control device, comprising:
a processor; and
a memory storing a computer program that, when executed by the processor, causes the processor to:
obtain a plurality of signal strengths received by an antenna circuit from each of a plurality of radiation directions, the plurality of radiation directions being formed by controlling on/off states of at least two switch circuits;
based on the plurality of signal strengths, determine a first strongest signal strength and a radiation direction corresponding to the strongest signal strength; and
lock in a first radiation direction of the antenna circuit in the radiation direction corresponding to the first strongest signal strength.

10. The antenna control device of claim 9, wherein the computer program further causes the processor to:
determine a scan duration, the scan duration indicating a time interval of two adjacent times of obtaining the plurality of signal strengths;
obtaining the plurality of signal strengths received by the antenna circuit from each of the plurality of radiation directions;
after a scan duration, re-obtain a plurality of signal strengths received by the antenna circuit from each of the plurality of radiation directions that correspond to the antenna circuit;
based on the re-obtained plurality of signal strengths, determine a second strongest signal strength and determine a second radiation direction corresponding to the second strongest signal; and
lock in the second radiation direction of the antenna circuit in the radiation direction corresponding to the second strongest signal strength.

11. The antenna control device of claim 9, wherein the computer program further causes the processor to:
obtain a second signal strength received by the antenna circuit at the radiation direction corresponding to the first strongest signal strength;
when a difference between the second signal strength and the first strongest signal strength is larger than a predetermined threshold, re-obtain a plurality of signal strengths received by the antenna circuit from each of the plurality radiation directions that correspond to the antenna circuit;
based on the re-obtained plurality of signal strengths, determine a third strongest signal strength and a third radiation direction corresponding to the third strongest signal strength; and
lock in the third radiation direction of the antenna circuit in the radiation direction corresponding to the third strongest signal strength.

12. The antenna control device of claim 9, wherein for each of the at least two switch circuits, a corresponding switch circuit includes a diode or a field effect transistor.

13. The antenna control device of claim 9, wherein for each of the at least two switch circuits, an arrangement direction of a corresponding switch circuit is different from a direction of a current flowing through a ground of the antenna circuit.

\* \* \* \* \*